United States Patent [19]

Lech, Jr. et al.

[11] Patent Number: 4,461,376
[45] Date of Patent: Jul. 24, 1984

[54] CLUTCH DRIVEN PLATE ASSEMBLY WITH MULTI-PART HUB

[75] Inventors: Thaddeus Lech, Jr., Sterling Heights, Mich.; Kenneth A. Weage, deceased, late of Plymouth, Mich., by Caroline J. Weage, legal representative

[73] Assignee: Borg-Warner Corporation, Chicago, Ill.

[21] Appl. No.: 346,313

[22] Filed: Feb. 5, 1982

[51] Int. Cl.$^3$ .................... F16D 3/14; F16D 13/68
[52] U.S. Cl. .................... 192/106.2; 192/30 V; 192/106.1; 192/70.17; 464/68
[58] Field of Search ............ 192/106.1, 106.2, 30 V, 192/55, 70.17, 70.19; 464/66, 68, 903, 61, 62

[56] References Cited

U.S. PATENT DOCUMENTS

| | | | |
|---|---|---|---|
| Re. 27,126 | 5/1971 | Gingerly | 192/70.13 |
| 2,026,733 | 1/1936 | Fast | 192/69 |
| 2,276,416 | 3/1942 | Nutt | 192/68 |
| 3,181,673 | 5/1965 | Poliseo | 192/103 |
| 3,299,671 | 1/1967 | DeCastelet | 464/68 X |
| 3,362,194 | 1/1968 | Bertelson et al. | 64/27 |
| 3,428,155 | 2/1969 | Binder et al. | 192/106.2 X |
| 3,556,273 | 1/1971 | Maucher | 192/106.2 |
| 4,016,962 | 4/1977 | Black | 192/70.2 |
| 4,190,142 | 2/1980 | Berlioux | 192/106.2 |

FOREIGN PATENT DOCUMENTS 2078906 1/1982 United Kingdom ............ 464/68

OTHER PUBLICATIONS

U.S. patent application Ser. No. 212,925, filed Dec. 4, 1980, Thaddeus Lech, Jr.
U.S. patent application Ser. No. 248,106, filed Mar. 27, 1981, Thaddeus Lech, Jr.

Primary Examiner—Rodney H. Bonck
Assistant Examiner—David D. House
Attorney, Agent, or Firm—James A. Geppert

[57] ABSTRACT

A clutch driven plate assembly for use in an automotive vehicle having a multi-part hub assembly with the capability of trapping lubricant in the gear teeth when the assembly is subjected to centrifugal force in operation. The hub assembly includes an inner hub in axial splined engagement with the transmission input shaft, an outer hub with an integral radial flange and in splined engagement with the inner hub through helical splines. The inner hub is formed of a light weight non-metallic material, or the outer hub houses an annular spacer formed of an impact and sound-absorbing material to cushion the inner hub upon reciprocation thereof within the outer hub, the outer hub having end plates which act as a dam for lubricant within the intermeshing helical gear teeth.

11 Claims, 6 Drawing Figures

CLUTCH DRIVEN PLATE ASSEMBLY WITH MULTI-PART HUB

BACKGROUND OF THE INVENTION

In an automotive vehicle having a conventional friction clutch between the vehicle engine and the manually-actuated transmission, the engine characteristics include power and inertia impulses which will drive the clutch with an irregular series of intermittent thrusts when the transmission is in neutral position, the clutch is engaged and the engine is at idle rpm. These impulses are transmitted to the transmission gears which become excited to oscillate through their backlash space and produce objectionable gear rattle. U.S. patent application Ser. No. 212,925, filed Dec. 4, 1980 discloses several embodiments of a clutch driven plate assembly designed to overcome the above problem, and the present invention relates to improvements in the construction of the invention of the above cited application.

SUMMARY OF THE INVENTION

The present invention comprehends the provision of a clutch driven plate assembly in a friction clutch between a vehicle engine and a manual transmission therefor having a novel hub construction to dissipate engine impulses which would normally produce objectionable gear rattle in the transmission when in neutral position with the clutch engaged and the engine at idle rpm. The hub assembly includes an inner hub in splined engagement with the transmission input shaft, and an outer hub in splined engagement with the inner hub through helical splines or gear teeth to allow relative axial reciprocation between the hubs to dissipate the engine impulses; the outer hub having a radial flange sandwiched between clutch and spring retainer plates of the assembly. The inner hub is formed of a non-metallic, resilient impact absorbing material, or a spacer of such a material is inserted between the inner and outer hubs, and means are provided to dam gear lubricant in the helical gear teeth or splines to prevent migration when subjected to centrifugal force during operation.

The present invention also comprehends the provision of a clutch driven plate assembly in a friction clutch for an automotive vehicle having a novel hub assembly including an inner hub with inner axial splines and exterior helical splines and an outer hub having internal helical splines and a radially extending flange. The outer hub also has end plates which limit the axial movement of the inner hub within the outer hub and act as a dam to retain the lubricant between the helical splines or teeth.

The present invention further comprehends the provision of a clutch driven plate assembly having a novel hub assembly having inner and outer hubs connected by helical splines, and wherein lubricant is retained between the splines by a flexible shield having an inwardly extending lip to engage the end of the transmission input shaft projecting through the inner hub. During handling and shipping, a plug is inserted in the central opening of the inner hub to retain lubricant in the assembly; the plug being removed before the transmission shaft is inserted.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENTS

Figure 1:
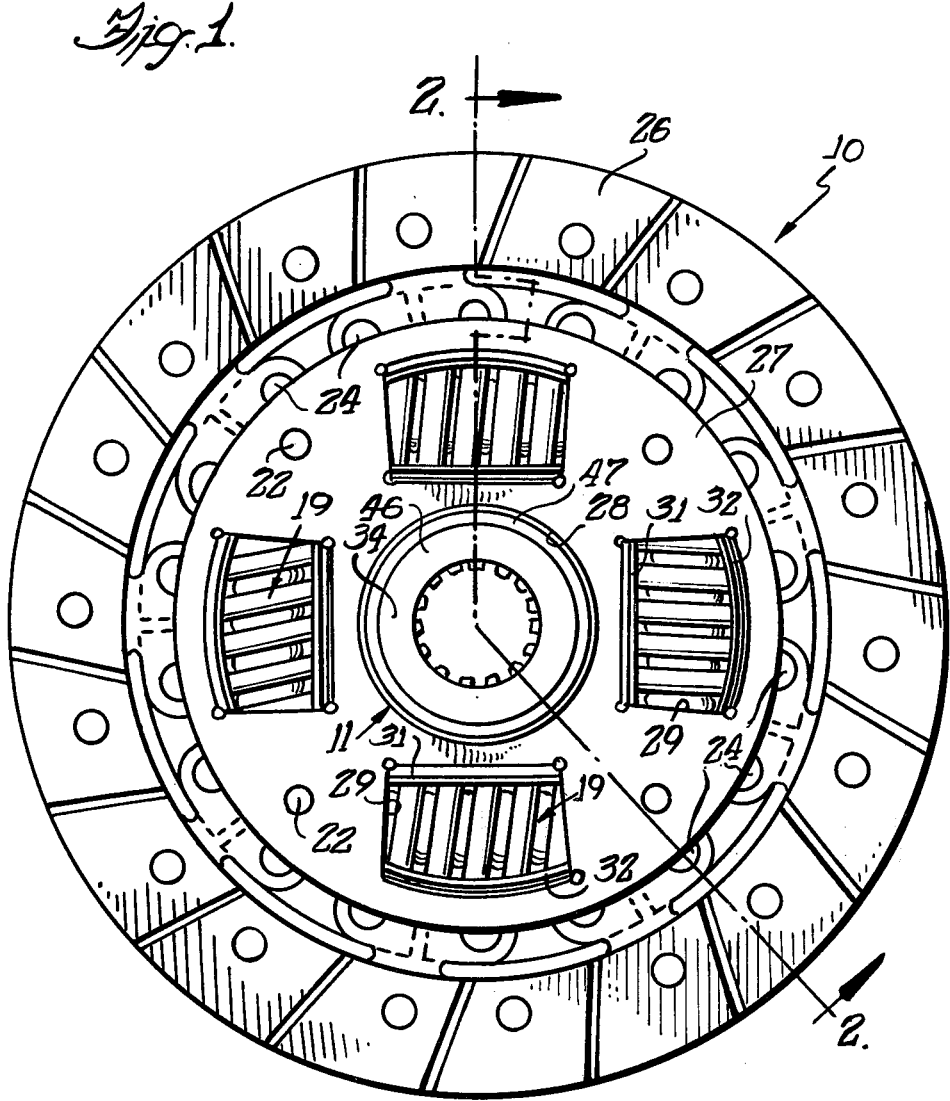
FIG. 1 is a rear elevational view of a clutch plate assembly incorporating the present invention therein.
Figure 2:
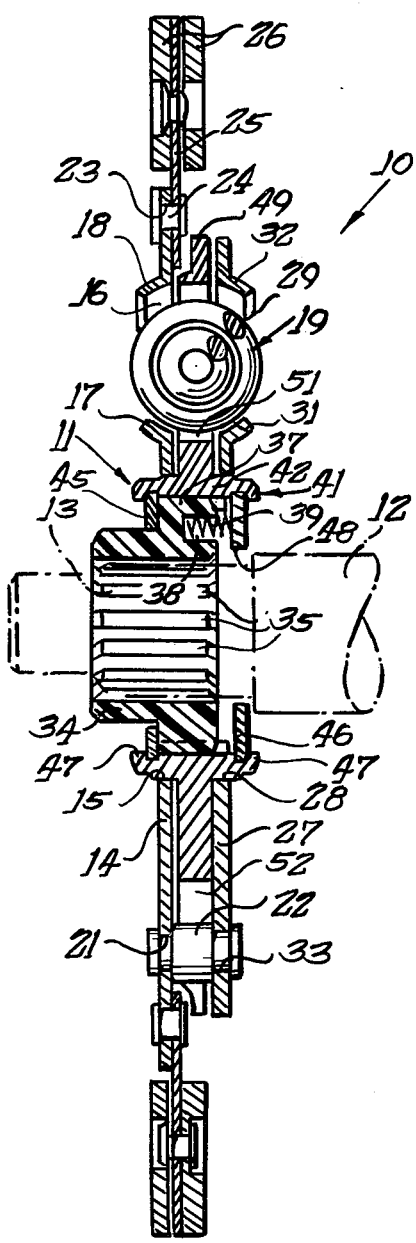
FIG. 2 is a cross sectional view of the clutch plate assembly taken on line 2—2 of FIG. 1.

Referring more particularly to the disclosure in the drawings wherein are shown illustrative embodiments of the present invention, FIGS. 1 and 2 disclose a clutch driven plate assembly 10 for use in a driveline in an automotive vehicle between the engine and the manual transmission (not shown). The clutch plate assembly includes a hub assembly 11 in splined engagement with the splined end 13 of a transmission input shaft 12, and a clutch plate 14 and a spring retainer plate 27 secured together in spaced relation and journalled on the hub assembly.

The clutch plate 14 is a generally flat plate having a central opening 15 receiving the hub, a plurality of arcuate spring windows 16 with inner and outer lips 17 and 18 acting to retain damper springs 19 therein, a plurality of openings 21 to receive one end of spacer rivets 22, and a plurality of openings 23 adjacent the plate periphery. A plurality of spring cushions 25 carrying the friction facings 26,26 are secured to the clutch plate through rivets 24 in the openings 23.

The spring retainer plate 27 is also a generally flat disc having a central opening 28, a plurality of spring windows 29 with inner and outer lips 31 and 32, and a plurality of openings 33 receiving the opposite ends of the spacer rivets 22. The spring windows 16 and 29 of the plates 14 and 27 and the openings 21 and 33 are axially aligned for the two plates for reception of the damper springs and spacer rivets, respectively.

The hub assembly 11 includes an inner hub or barrel 34 and an outer hub 41; the inner hub barrel having internal axially extending splines 35 engaging the splined end 13 of shaft 12, and a radial flange 36 formed at the rear end of the barrel has external helical splines 37 thereon. The hub barrel is preferably formed of a non-metallic, impact absorbing material, such as nylon with 30% glass fibers which is light in weight, self-lubricating and inexpensively molded. The rear face of the flange 36 has a plurality of circumferentially spaced axially extending holes 38 containing coil springs 39 that urge the inner hub forwardly relative to the outer hub.

The outer hub 41 has a generally cylindrical body 42 with internal helical splines 43 meshing with the splines 37 and counterbored at each end 44 to receive end plates 45 and 46 positioned at the ends of splines 43. Once in place, the ends 44 are crimped or spun over at 47 to retain the plates in the resulting annular grooves. The end plate 46 has a smaller diameter central opening 48 so that the plate will form an abutment for the ends of the coil springs 39 extending from the holes 38. A radial flange 49 is integral with the body 42 and is provided with damper spring windows 51 axially aligned with the windows 16 and 29 and a plurality of peripheral notches 52 through which the spacer rivets 22 extend. The notches are of such an arcuate length as to provide limited lost motion between the joined plates 14 and 27 and the flange 49 when the springs 19 are under load. Friction washers 53 may be positioned between the plates and hub flange to provide additional frictional damping.

When assembled, the central openings 15 and 28 on plates 14 and 27 are journalled onto the outer hub body 42 adjacent the radial flange 49 with the friction washers 53 sandwiched therebetween. With the transmission in neutral position and the friction facings 26 engaged between the flywheel and pressure plate (not shown), the engine at idle rpm exerts power and inertia impulses which are not of sufficient strength to overcome the force of the damper springs 19. Therefore, these impulses or thrusts are conveyed through the friction facings and clutch and spring retainer plates directly to the flange 49 of the outer hub 41 causing rotational motion thereof. This rotation acts on the inner hub 34 through the intermeshed helical splines 37,43 to result in axial movement of the inner hub against the force of the springs 39.

As the inner hub moves from the end plate 45 to end plate 46, the springs 39 are compressed, and the material of the inner hub is sufficiently resilient to absorb the impact and sound produced when the hub strikes either end plate 45 or 46. The material forming the inner hub may be self-lubricating or may be lubricated with a suitable lubricant, such as Dow Corning's "Molykote G-n". Where a lubricant is utilized between the helical splines or gear teeth, the end plates 45 and 46 act as a dam to prevent migration of any lubricant from the splines when the assembly is subjected to centrifugal force in operation.

Figure 3:
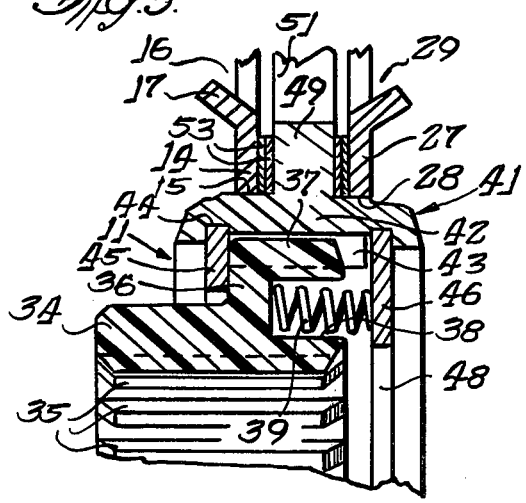
FIG. 3 is an enlarged partial cross-sectional view of the hub assembly of FIG. 2.
Figure 4:
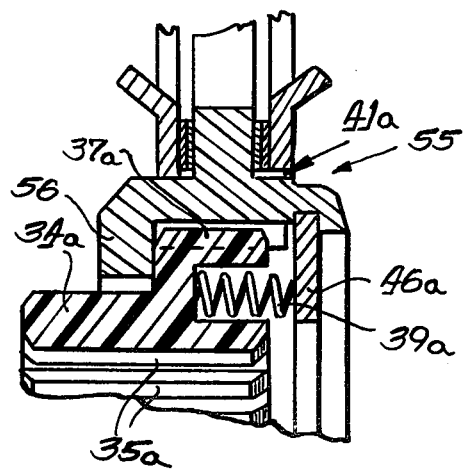
FIG. 4 is an enlarged partial cross-sectional view similar to FIG. 3 but showing an alternate embodiment of hub assembly.

FIG. 4 discloses an alternate embodiment of damper hub assembly 55 wherein like parts will be denoted by the same reference numeral with a script a. The inner hub 34a is identical with the inner hub 34 of FIGS. 1 through 3 with the internal axial splines 35a and the external helical splines 37a. The outer hub 41a is similar to the outer hub of FIGS. 1–3 except for an inwardly extending end flange 56 in place of the end plate 45. Thus, the inner hub 34a reciprocates between the flange 56 and the end plate 46a, with the coil springs 39a biasing the inner hub toward the end flange 56. This hub is formed of the same non-metallic, impulse absorbing material as the inner hub 34 and the intermeshing helical splines may have lubricant, as desired.

Figure 5:
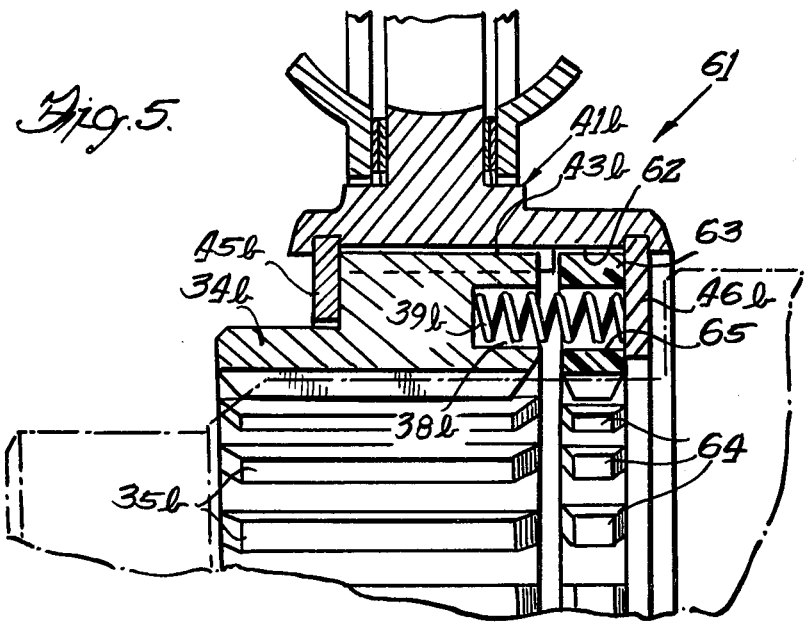
FIG. 5 is an enlarged partial cross-sectional view of a third embodiment of hub assembly.

FIG. 5 discloses a third embodiment of hub assembly 61 wherein the inner hub 34b is identical with the hub 34 of FIGS. 1 through 3 except it is formed of a conventional metal. The outer hub 41b is generally similar to that of FIGS. 1 through 3 except for a pilot diameter 62 at the ends of the internal helical splines 43b to receive a generally annular spacer 63 with internal axial splines or gear teeth 64 and a plurality of holes 65 axially aligned with the holes 38b in the inner hub 34b. Coil springs 39b project from the inner hub through the holes 65 to engage the end plate 46b; the spacer 63 being located between the ends of the helical splines 43b end plate 46b.

The spacer 63 is formed of an impact and sound absorbing material, such as that disclosed for inner hub 34. The springs 39b pilot in the holes 38b and pass through the holes 65 which are in alignment to index the spline teeth 64 to the spline teeth 35b for assembly purposes. This assembly operates in the same manner as that shown in FIGS. 1 through 3 except that the impact and sound are absorbed in the spacer 63 when the inner hub 34b strikes it. The spacer 63 pilots the outer hub 41b concentric to the diameter 62 to reduce binding in the helical gear teeth or splines. Suitable lubricant is provided for the helical gear teeth and is contained in the gear mesh by the end plates 45b,46b which act as a dam to prevent migration when the assembly is subjected to centrifugal force in operation.

Figure 6:
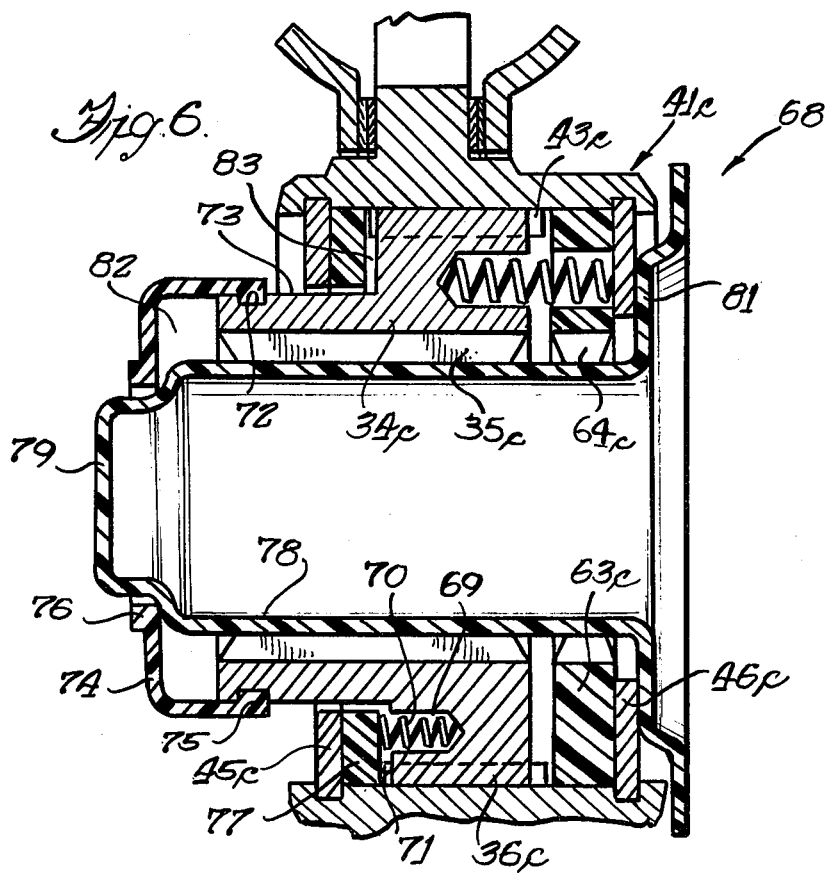
FIG. 6 is an enlarged partial cross-sectional view of a fourth embodiment of hub assembly.

FIG. 6 relates to a fourth embodiment of hub assembly 68 similar to the assembly of FIG. 5. The inner hub 34c is substantially identical to that shown in FIGS. 1 through 3, except it is formed of metal and has a plurality of circumferentially spaced holes 69 in the shoulder 71 formed by the flange 36c opening forwardly toward the end plate 45c and housing coil springs 70. Also, adjacent the forward end of the inner hub, an annular groove 72 is formed in the outer surface 73 to receive an annular lip 75 on a resilient shield 74, which also has an inwardly directed sealing lip 76.

The internal helical splines 43c in the outer hub 41c terminates short of both end plates 45c,46c. A non-metallic impact absorbing spacer 63c is located between the end of the splines 43c and the end plate 46c in the same manner as shown in FIG. 5, while a second annular non-metallic impact absorbing spacer 77 is located between end plate 45c and the forward ends of the helical splines 43c. A plug 78 having a forward closed end 79 and a rearward radial flange 81 is inserted in the inner hub 34c and spacer 63c to engage the inner splines 35c and 64c, respectively, to retain lubricant in the assembly during handling and shipping, and the plug is removed before the transmission shaft is inserted. Also, the lip 76 of the resilient shield 74 engages the outer surface of the end of the transmission shaft projecting through the hub 34c, such that the shield captures any lubricant that migrates out of the splines 35c. For this purpose, the lip 76 extends below the root of the transmission shaft spline to capture any lubricant from the mesh to be retained in the area 82.

This assembly operates in an identical fashion to the structure shown in FIG. 5, except it has a gap 83 to provide a coast travel for the hub 34c which compresses the springs 70 before striking the impact absorbing spacer 77. The purpose of the spring loaded coast travel is to absorb impulses when the vehicle engine reverses itself for a portion of a normal rotation during rough idle periods.

We claim:

1. In a clutch driven plate assembly for an automotive vehicle clutch operatively connected to a transmission input shaft, wherein the assembly comprises a multipart hub assembly having a radial hub flange, a clutch plate and a spring retainer plate secured together to sandwich the hub flange therebetween, friction facings carried by said clutch plate, said plates and hub flange having axially aligned sets of circumferentially spaced windows therein, and damper springs received in each aligned set of windows, the multipart hub assembly including an inner hub having an internally splined passage receiving the transmission input shaft, and an outer hub having said radial flange integral therewith, intermeshing helical splines formed on the external surface of said inner hub and the internal surface of said outer hub to allow relative axial movement between said hubs upon rotation of the outer hub, the improvement comprising said inner hub being formed entirely of a non-metallic resilient impact-absorbing material and having a plurality of axially extending pockets opening from at least one end thereof, a pair of annular motion limiting end plates received in annular grooves formed in the outer hub beyond the ends of said helical splines, and a plurality of compression springs received in said pockets and abutting one of said motion limiting plates.

2. A clutch driven plate assembly as set forth in claim 1, in which one end plate has a smaller diameter central opening than said opposite end plate and is engaged by said compression springs.

3. A clutch driven plate assembly as set forth in claim 1, in which said inner hub has a barrel extending axially beyond the forward end of said outer hub and a radial flange having said helical splines on the outer surface thereof, and a resilient shield mounted on the forward end of said hub barrel and having an inwardly directed lip in wiping engagement with the end of the transmission input shaft extending through said inner hub barrel.

4. A clutch driven plate assembly as set forth in claim 3, in which the external surface of said hub barrel has an annular groove receiving an annular lip on said shield.

5. In a clutch driven plate assembly for an automotive vehicle clutch operatively connected to a transmission input shaft, wherein the assembly comprises a multi-part hub assembly having a radial hub flange, a clutch plate and a spring retainer plate secured together to sandwich the hub flange therebetween, friction facings carried by said clutch plate, said plates and hub flange having axially aligned sets of circumferentially spaced windows therein, and damper springs received in each aligned set of windows, the multi-part hub assembly including an inner hub having an internally splined passage receiving the transmission input shaft, and an outer hub having said radial flange integral therewith, intermeshing helical splines formed on the external surface of said inner hub and the internal surface of said outer hub to allow relative axial movement between said hubs upon rotation of the outer hub, the improvement comprising said inner hub being formed entirely of a non-metallic resilient impact-absorbing material and having a plurality of axially extending pockets opening from at least one end thereof, an inwardly extending flange at one end of said outer hub, an annular motion limiting end plate received in an annular groove formed in the outer hub beyond the ends of said helical splines opposite to the hub flange, and a plurality of compression springs received in said pockets and abutting said motion limiting plate.

6. In a clutch driven plate assembly for an automotive vehicle clutch operatively connected to a transmission input shaft, wherein the assembly comprises a multipart hub assembly including an inner hub having an internally splined passage receiving the transmission input shaft, and an outer hub having an integral radial flange, intermeshing helical splines formed on the external surface of said inner hub and the internal surface of said outer hub to allow relative axial movement between said hubs upon rotation of the outer hub, a clutch plate and a spring retainer plate secured together to sandwich the hub flange therebetween, friction facings carried by said clutch plate, said plates and hub flange having axially aligned sets of circumferentially spaced windows therein, and damper springs received in each aligned set of windows, the improvement comprising said inner hub including a reciprocable hub portion and a stationary annular spacer, said spacer being formed of resilient impact-absorbing material to be engaged by said hub portion upon reciprocation, motion limiting means at the opposite ends of said outer hub, said inner hub portion having a plurality of axially extending pockets opening from at least one end thereof, and a plurality of compression springs received in said pockets and abutting said motion limited means.

7. A clutch driven plate assembly as set forth in claim 6, wherein said motion limiting means includes at least one end plate abutting said resilient spacer, said spacer having inner axial splines aligned with the splines of the inner hub portion and a plurality of passages therethrough axially aligned with and receiving said compression springs to allow the springs to abut said end plate.

8. A clutch driven plate assembly as set forth in claim 7, wherein said spacer is located in the outer hub between said end plate and the ends of the helical splines therein.

9. A clutch driven plate assembly as set forth in claim 8, wherein a second end plate is located in the end of the outer hub at the opposite ends of the helical splines from said spacer.

10. A clutch driven plate assembly as set forth in claim 9, including a second annular spacer formed of resilient impact-absorbing material encompassing said inner hub portion and located between the ends of the helical splines in the outer hub and said second end plate.

11. A clutch driven plate assembly as set forth in claim 10, wherein said inner hub portion has a plurality of axially extending second pockets opening in the opposite direction to the first mentioned pockets, and a plurality of second compression springs received in said second pockets and abutting said second spacer.

* * * * *

UNITED STATES PATENT AND TRADEMARK OFFICE
CERTIFICATE OF CORRECTION

PATENT NO. : 4,461,376
DATED : July 24, 1984
INVENTOR(S) : THADDEUS LECH JR. and KENNETH A. WEAGE, deceased It is certified that error appears in the above—identified patent and that said Letters Patent is hereby corrected as shown below:

Claim 3, line 2, as follows:

Column 5, line 18, cancel "1" and insert
-- 6 --.

*Signed and Sealed this*

*Twenty-seventh* Day of *August 1985*

[SEAL]

*Attest:*

DONALD J. QUIGG

*Attesting Officer*     *Acting Commissioner of Patents and Trademarks*